US006618778B1

(12) United States Patent
MacCormack

(10) Patent No.: US 6,618,778 B1
(45) Date of Patent: Sep. 9, 2003

(54) ARBITER FOR ARBITRATING BETWEEN A PLURALITY OF REQUESTERS AND METHOD THEREOF

(75) Inventor: Andrew MacCormack, Edinburgh (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 0 days.

(21) Appl. No.: 09/637,987

(22) Filed: Aug. 11, 2000

(30) Foreign Application Priority Data

Aug. 13, 1999 (GB) .............................................. 9919208

(51) Int. Cl.[7] .............................................. G06F 13/14
(52) U.S. Cl. ........................ 710/244; 710/241; 710/40; 711/151
(58) Field of Search ................................ 710/107–125, 710/240–244, 36–51; 711/147–153

(56) References Cited

U.S. PATENT DOCUMENTS

| 3,701,109 A | * | 10/1972 | Peters .................... 340/825.51 |
| 4,760,515 A | * | 7/1988 | Malmquist et al. .......... 710/121 |
| 4,953,081 A | * | 8/1990 | Feal et al. .................. 710/111 |
| 4,979,100 A | * | 12/1990 | Makris et al. ............... 710/117 |
| 5,241,632 A | * | 8/1993 | O'Connell et al. .......... 710/117 |
| 5,303,382 A |   | 4/1994 | Buch et al. .................. 395/725 |
| 5,623,672 A |   | 4/1997 | Popat ........................... 395/728 |
| 5,784,569 A | * | 7/1998 | Miller et al. ................. 709/235 |
| 6,076,132 A | * | 6/2000 | Chen ........................... 710/241 |
| 6,199,127 B1 | * | 3/2001 | Ajanovic ..................... 710/100 |
| 6,385,678 B2 | * | 5/2002 | Jacobs et al. ............... 710/113 |
| 6,473,817 B1 | * | 10/2002 | Jeddeloh ..................... 710/113 |

FOREIGN PATENT DOCUMENTS

WO          WO 97/19410          5/1997          ......... G06F/13/364

OTHER PUBLICATIONS

Standard Search Report from the corresponding United Kingdom application.

* cited by examiner

Primary Examiner—Sumati Lefkowitz
(74) Attorney, Agent, or Firm—Wolf, Greenfield & Sacks, P.C.; James H. Morris; Robert A. Skrivanek, Jr.

(57) ABSTRACT

An arbiter for arbitrating between a plurality of requests from a plurality of requesters, said arbiter being arranged to assign an order of priority of said requesters, the requester having the highest priority and which has made a request winning the arbitration, wherein the arbiter determines a new priority for said winning requester, said winner being given a priority different from the lowest priority.

22 Claims, 7 Drawing Sheets

ARBITER FOR ARBITRATING BETWEEN A PLURALITY OF REQUESTERS AND METHOD THEREOF

FIELD OF THE INVENTION

The present invention relates to a arbiter and a method of arbitration and in particular, but not exclusively to an arbiter for requests for obtaining memory access.

BACKGROUND OF THE INVENTION

Hardware memory arbiters of various different types are known. The simplest type is a fixed priority system. In this system, each device requesting access to the memory is allocated a priority. The device having the highest allocated priority and which is requesting access will always win access to the memory. Whilst fixed priority arbiters ensure that it is always known which device wins access to the memory, it can result in a device with a low priority being starved of access to the memory. In other words, low priority devices may, in certain circumstances, be prevented from having access to the memory. However, this scheme does allow those devices which require frequent access to the memory to have a greater share of the available accesses.

A second type of memory arbiter is a rotating priority or round robin arbiter. This is illustrated in FIG. 1. A, B, C and D represent devices requesting access to the memory. The device with the current highest priority is at the top of the list whilst the device with the current lowest priority is at the bottom of the device. An X next to the device indicates that the device is requesting access to the memory. Initially, as device A has the highest priority and is requesting access to the memory, it is granted access to the memory. This is illustrated in FIG. 1a.

Subsequently, as illustrated in FIG. 1b, device A is assigned the lowest priority and device B now has the highest priority. As device B is requesting access to the memory, and it has the highest priority, it is granted access to the memory. Next, as shown in FIG. 1c, device B is given the lowest priority and device C now has the highest priority. As device C has requested access to the memory it wins access to the memory.

Likewise, in FIG. 1d, device D has the highest priority and has requested access to the memory and thus wins access to the memory. Device C has the lowest priority.

However, in FIG. 1e, device A has the highest priority but has not requested access to the memory. Accordingly, the device having the highest priority and which has requested access to the memory wins. In the case of FIG. 1e that is device B.

Device B is then assigned the lowest priority but device A maintains its highest priority. This is shown in FIG. 1f. However, device C is the highest priority device requesting access and thus wins the arbitration.

This system has the advantage that each device has an equal chance of winning over time. However, this does not allow for one device to have a greater proportion of the available bandwidth. This means that the operation of the system can be slowed unnecessarily.

More complex schemes have been proposed which, for example, consider the last N accesses/cycles and determine the winner for a current access or cycle taking into account the number of past wins of each device as well as its priority. However, these systems require a large amount of hardware to implement. This may mean that the arbiter may take up a large area on a integrated circuit, which is undesirable as this slows down the time taken to make arbitration decisions. This latter disadvantage can result in delays being introduced into the system which may offset any advantage obtained from the particular use of the complex arbitration scheme.

SUMMARY OF THE INVENTION

Accordingly, it is an aim of embodiments of the present invention to provide an arbiter and a method of arbitration which overcomes the disadvantages of the various known schemes.

According to one aspect of the present invention, there is provided an arbiter for arbitrating between a plurality of requests from a plurality of requesters, said arbiter being arranged to assign an order of priority of said requesters, the requester having the highest priority and which has made a request winning the arbitration, wherein the arbiter determines a new priority for said winning requester, said winner being given a priority different from the lowest priority.

Arbiters embodying the present invention can be implemented simply and yet provide a degree of complexity to the arbitration.

Preferably, the arbiter is arranged to assign relegation information to each of the requesters, the relegation information determining the priority of a winner of the arbitration after the winner has won an arbitration. The relegation information may comprise an arbitration value which defines the number of positions by which the winner of the arbitration is relegated. Alternatively, the relegation information may take the form of a relegation position which defines the position to which the winner of the arbitration is relegated.

The relegation information can be changed during use of the arbiter. In other words, the arbiter can be configured during use.

Preferably, the arbiter has a list of requesters, the list defining the priority of the requesters, wherein the list is arranged to include at least one requester in at least two different positions in the list. The list is preferably longer than the number of requesters. The winner of an arbitration can either go to the end of the list or be inserted into a position within the list.

It should be appreciated that not all winners will be given a priority different from the lowest priority. In some embodiments of the present invention, at least one winner may be given a priority different from the lowest priority.

According to a second aspect of the present invention, there is provided an arbiter for arbitrating between a requests from a plurality of requesters, said arbiter being arranged to assign an order of priority to said requesters and relegation information to each of said requesters, the relegation information determining the priority of a winner of said arbitration after the winner has won an arbitration.

According to a third aspect of the present invention there is provided an arbiter for arbitrating between a plurality of requests from a plurality of requesters, said arbiter having a list of requesters, at least some of said requesters making requests, the list defining the priority of said requesters, wherein said list is arranged to include at least one requester in at least two different positions in said list.

In this example, the length of the list may be changed during use of the arbiter. The winner of an arbitration may be sent to the end of the list or may be inserted at a given position within the list.

According to a fourth aspect of the present invention, there is provided an arbiter for arbitrating between a plurality of requests from a plurality of requesters, said arbiter assigning a priority to each of said requesters, the priority assigned to each requester determining the frequency with which each requester wins an arbitration, wherein said arbiter is configurable to provide to the required priority for each requester.

The arbiter may be configured prior to use and/or be alterable during use.

The arbiter may arbitrate between requests from requesters requesting access to a memory. The requester can be a device or a channel.

The arbiter may be arranged to consider only some of the requesters when arbitrating between the requesters, the considered requesters having the highest priority.

It should be appreciated that the various aspects described hereinbefore can be used in conjunction with each other.

According to a still further aspect of the present invention, there is provided a method of arbitrating between a plurality of requests from a plurality of requesters, said method comprising assigning an order of priority to the requesters, determining which requester has the highest priority and which has made a request, said requester winning the arbitration, determining a new priority for the winning requester, the new priority being different from the lowest priority.

BRIEF DESCRIPTION OF THE DRAWINGS

For a better understanding of the present invention and as to how the same may be carried into effect, reference will now be made by way of example to the accompanying drawings in which.

DETAILED DESCRIPTION OF EMBODIMENT OF THE INVENTION

Figure 1:
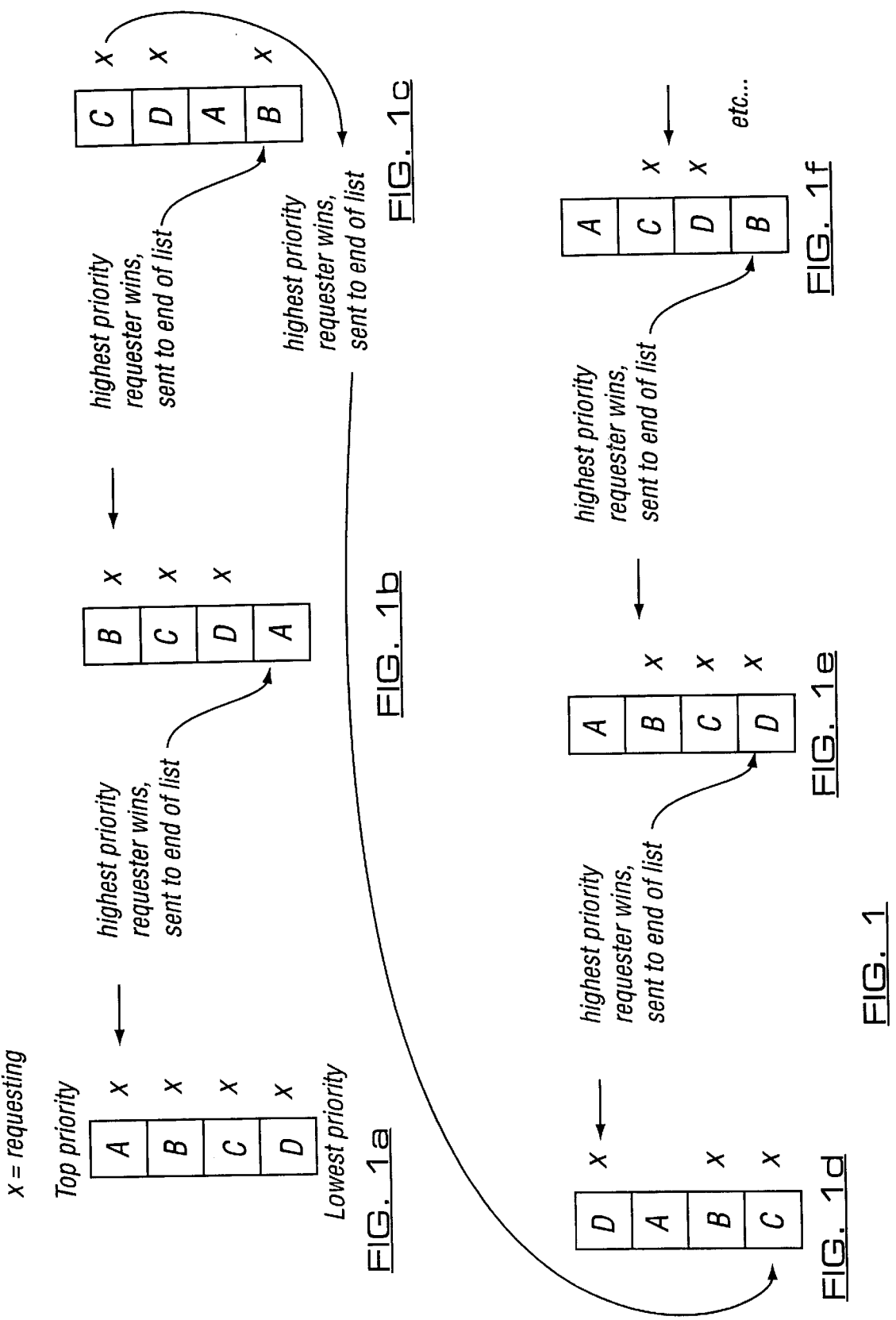
FIG. 1 (FIGS. 1a–1f) shows a known rotating priority arbiter.
Figure 2:
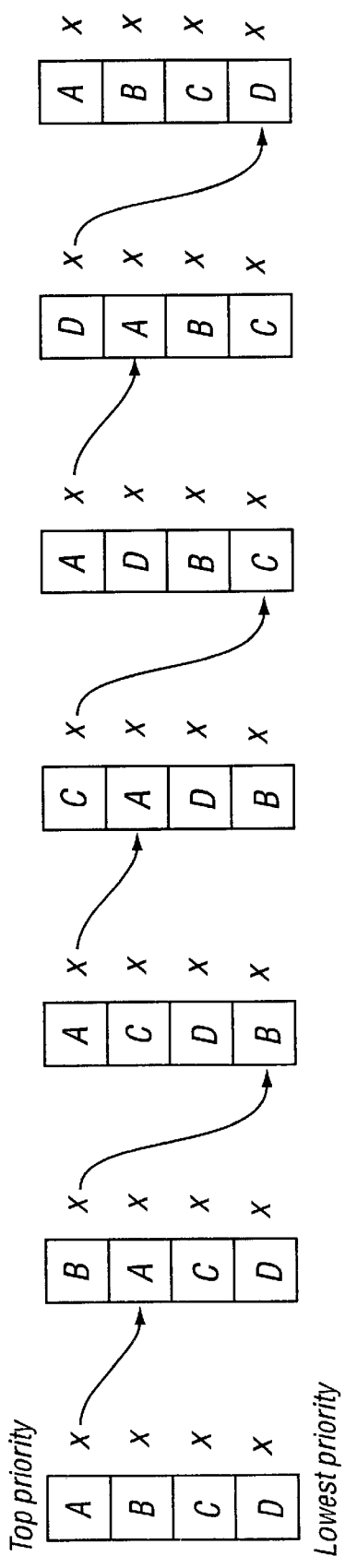
FIG. 2 (FIGS. 2a–2g) shows a arbiter embodying the present invention.

Reference is now made to FIG. 2 which shows an arbiter embodying the present invention. In particular, FIGS. 2a to 2g show seven successive arbitration decisions. Initially, device A has the highest priority and device D has the lowest priority with devices B and C having the second and third highest priorities respectively. As with FIG. 1, an X indicates that access is being requested. As device A has the highest priority and is requesting access, in FIG. 2a, device A will win the arbitration.

However, as shown in FIG. 2b, device 2A is not assigned the lowest priority but instead is assigned the second highest priority and is inserted between device B and device C in the list of priority. As device B now has the highest priority and has requested access, it will win the arbitration.

Next, device B is moved to the bottom of the list and thus has the lowest priority, as shown in FIG. 2c. Device A thus has the highest priority and as it is requesting access, it wins the arbitration.

As illustrated in FIG. 2d, device A is again given the second highest priority and is inserted in the list between devices C and D. As device C has the highest priority and has requested access, it wins the arbitration.

In FIG. 2e device A again wins the arbitration and, as illustrated in FIG. 2f is inserted into the list with the second highest priority. Device D wins the arbitration and, as shown in FIG. 2g is assigned the lowest priority. Device A again has the highest priority and as it requesting access, it wins the arbitration.

In the example shown in FIG. 2, if all of the devices continually make requests, device A will win 50% of its requests and the other devices B, C and D will share the other 50% of accesses.

The principal illustrated in relation to FIG. 2 can be extended so as to control the amount by which each device is relegated in terms of its priority when it wins an arbitration. In the example shown, device A is relegated by one position whilst devices B, C and D are all relegated by three positions if they win the arbitration.

By programming the value by which each device is relegated after winning an arbitration, the arbiter can be configured to operate in the most appropriate manner taking into account the nature of the devices. If all the relegation values are zero, this means that any winner will not move in the list and a fixed priority arbiter is thus established. Each device can have the same or different programming values between zero (where the device winning the arbitration stays in the same position) and a value of L-1 where L is the number of devices in the list.

Reference is made to table 1 which shows how an arbiter can deal with four devices.

TABLE 1

| Relegation values | | | | | Percentage of wins | | | |
|---|---|---|---|---|---|---|---|---|
| A | B | C | D | Description | A | B | C | D |
| 0 | 0 | 0 | 0 | Fixed priority | 100% | 0% | 0% | 0% |
| 0 | 3 | 3 | 3 | 'A' fixed, BCD rotating | 100% | 0% | 0% | 0% |
| 1 | 3 | 3 | 3 | 'A' gets 50% | 50% | 16.66% | 16.66% | 16.66% |
| 2 | 3 | 3 | 3 | 'A' gets 83% | 33.33% | 22.22% | 22.22% | 22.22% |
| 1 | 2 | 3 | 3 | 'B' gets more than 'C' and 'D', 'A' gets most | 50% | 25% | 12.5% | 12.5% |
| 2 | 2 | 3 | 3 | 'A' and 'B' equal but more than 'C' and 'D' | 33.33% | 33.33% | 16.66% | 16.66% |
| 3 | 3 | 3 | 3 | Rotating priority | 25% | 25% | 25% | 25% |

In the first example given in the table, the relegation value, that is the position to which a device is relegated if it wins arbitration, for each of devices A, B, C and D is zero. In other words, the arbiter acts as a fixed priority arbiter. For example, if device A has the highest priority and it always has a request, then device A will always win. In this example as well as the following examples, the initial priority is considered to be devices A, B, C and then device D. As shown in this example, where a contender has zero relegation value, it will lock out all other devices if it has a higher priority and is always requesting. This of course can lead to starvation where devices are prevented from accessing the memory. Fixed priorities may be desirable in certain scenarios but this always has to be weighed up against the risk of starvation.

However, in a dynamically programmable system, a device at risk of starvation could have a time out on its request which triggers an interrupt to the CPU requesting that it reprogrammes the relegation value to something more favourable.

As will be appreciated, the arbiter can be reprogrammed by the CPU during the operation of the device of which the arbiter forms a part or may be fixed in its operation by its initially programming.

Reference is made to the second example where the device with the highest priority initially has a relegation value of zero. The other three devices B, C and D have relegation values of 3 which means that they rotate. If device A makes requests on every cycle, it will win 100% of the time with devices B, C and D being starved of access.

However, consider the third example in which the first device, device A has a relegation value of 1 and the three remaining devices have a relegation value of 3. Device A will get 50% of the accesses with the remaining 50% shared amongst the remaining three devices.

The fourth example is similar to the third example except that the first device, device A has a relegation value of 2. This means that the first device, device A, will win the arbitration a ⅓ of the time. The remaining ⅔ of the time, the remaining three devices will win the same amount of access, i.e. around 22% of the accesses.

In the fifth example, device A has a relegation value of 1, device B has relegation value of 2 whilst devices C and D have a relegation value of 3. A will win 50% of the time. Device B will win 25% of the time whilst devices C and D will win 12½% of the time.

In the next example, device A and device B both have relegation values of 2 whilst devices C and D have a relegation value of 3. Accordingly, devices A and B will each win ⅓ of the time. However, devices C and D will only win ⅙ of the time.

Finally, if all the relegation values are 3, a rotating priority arbiter is obtained where each device has an equal chance of winning access.

In practice, not all of the devices will request access all of the time. For example if devices A to C had a relegation value of 2 and device D had a relegation value of 3, device D would be starved of access if all devices were requesting access all the time. If this is not the case, then device D will still get access to the device relatively frequently.

The nature of the accesses may be taken into consideration when considering the initial ordering of the priority list. A device at the top of the list but with a higher relegation value will not be at the top of the list once it has made its first request. This may be used to advantage, if the behaviour of the device is different straight after reset or alternatively this allows low priority tasks the opportunity to win an arbitration. It is of course apparent that a device with a zero relegation value will never go back down the list once it has reached the top and will always have the highest priority.

As mentioned hereinbefore, the arbiter may have the same configuration which is pre-programmed. Alternatively, the arbiter may have its programming changed during operation of the integrated circuit with which it forms a part by, for example, the CPU.

A further embodiment of the present invention will now be described with reference to table 2.

TABLE 2

| h1 | | | priority list | | | | | low |
|---|---|---|---|---|---|---|---|---|
| A | B | C | A | B | D | A | C | D |
| | | | top priority wins, goes to end of list | | | | | |
| B | C | A | B | D | A | C | D | A |
| | | | top priority wins, goes to end of list | | | | | |
| C | A | B | D | A | C | D | A | B |
| | | | top priority wins, goes to end of list | | | | | |
| A | B | D | A | C | D | A | B | C |
| | | A not requesting, 2nd priority wins, goes to end of list | | | | | | |
| | | | . . . etc. | | | | | |
| A | D | A | C | D | A | B | C | B |

In this embodiment, the list of requesters or devices has more slots than the total number of requesters. This means that some devices may be in the list more than once. In the examples, there are four requesters or devices A to D. The list is 9 deep with the highest priority on the left and the lowest priority on the right. In each case the device which wins the arbitration goes to the end of the list. Initially, A is at the top of the list and is requesting and therefore wins the arbitration. A is then sent to the end of the list (see the second line of the table) and B is now at the beginning of the list. B has the highest priority and as it is requesting wins the arbitration and is sent to the end of the list as can be shown from the third row of the table.

Device C is now at the top of the list and as it is requesting, wins the arbitration and thus goes to the end of the list as shown in row 4 of the table. Device A is now at the top of the list but not requesting. Accordingly, device B wins the arbitration and goes to the end of the list as shown in row 5 of the table.

In the example shown in relation to table 2, the winners of the arbitration are always sent to the end of the list. However, this is not necessarily the case and the winner of the arbitration can be sent to different locations in the list depending on the identity of the device, as described in relation to the first embodiment.

The amount of logic used to look at such long chains could, for example, be reduced by only looking at the top of the list, perhaps the top four or even three items of the list. This technique can also be used where the list is only as long as the number of requesters. This may lead to the disadvantage that lower priority requesters may miss their chance if they are outside the checked window when they make their requests. However, in certain situations, if the other requesters are not requesting anyway, there should be an opportunity for a lower priority requester to obtain access at a later date.

In an alternative embodiment of the present invention, the relegation amount, the position of a device in a list and even the length of the list may be calculated depending on a factor of the system. This factor could be activity of the system, status of the system, mode of the system, a factor of the device or the like. The length of the list may also be programmable. For example, the list may be pre-programmed so as to always have a predetermined length. However, the arbiter can be controlled during its operation to change the length of its list.

The first and second embodiments can be used in conjunction with one another.

Figure 3:
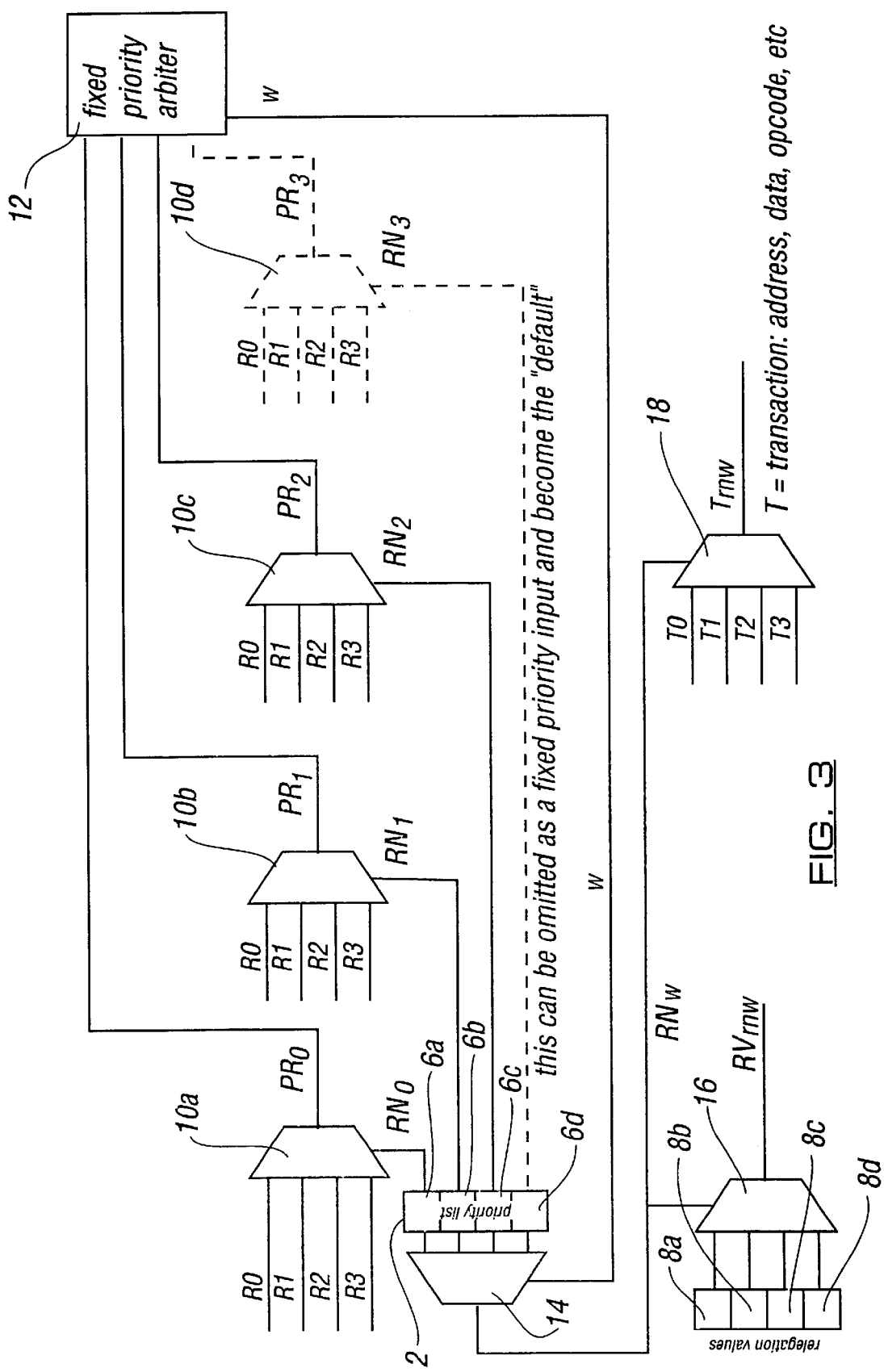
FIG. 3 shows the implementation of the arbiter of the first embodiment.

Reference is made to FIG. 3 which shows how the first embodiment of the present invention can be implemented.

The priority list 2 is implemented as four two bit registers 6a, 6b, 6c and 6d. These registers 6a to 6d are connected together to allow shifting up, relegation by a programmable amount and programming by an external device such as a CPU. Each device is assigned a two bit number which is used to represent that device. The first register 6a stores the identity of the device with the highest priority whilst the last register 6d stores the identity of the device with the lowest priority. The second and third registers 6b and 6c store the identity of the devices with the intermediate priority.

The relegation values are also stored in four two bit registers 8a to 8d. Each register stores the relegation value RV for one of the, devices. In the case of the first embodiment, the maximum relegation value is 3 (represented by 11 in binary form). In other words the relegation value RV can have any value from 0 to 3.

Each register 6a to 6d controls a respective 4 to 1 multiplexer 10a to 10d. Each of the multiplexers 10 receive an input from each of the requesters or devices. The first multiplexer 10a is controlled by the first register 6a of the priority list to output the request from the device having the highest priority. This will be request $PR_0$. The second register 6b of the priority list 2 will control the output of the second multiplexer 10b to output the request with the second highest priority $PR_1$. Likewise, the third register 6c controls the third multiplexer 10c to output the request with the third highest priority $PR_2$ and the fourth register 6d controls the fourth multiplexer lad to output the request $PR_3$ from the device with the lowest priority. The lowest priority multiplexer 10d can be omitted as a fixed priority input and instead the contents of the fourth register can be the default register.

An arbiter 12 is arranged to arbitrate between the various requests. The device having the highest priority which makes a request wins the arbitration. The priority arbiter provides a two bit output indicating which position in the priority list has won (index W). This is used to control a fifth multiplexer 14. The fifth multiplexer 14 receives an input from each of the four registers 6a to 6d of the priority list. The fifth multiplexer 14 is controlled to output the identity of the device which has won the arbitration. The output of the fifth multiplexer is used to control a sixth multiplexer 16 and a seventh multiplexer 18.

The sixth multiplexer 16 is connected to each of the four registers 8 of the relegation list. The output of the fifth multiplexer 14 controls the sixth multiplexer 16 to output the relegation value for the device winning the arbitration i.e. value $RV_{rnw}$.

The output of the fifth multiplexer 14 is also used to control the output of the seventh multiplexer 18. The seventh multiplexer 18 receives the transactions from each of the four devices and outputs the transaction $T_{rnw}$ associated with the device which has won the arbitration. The signals involved in the request may be one or more of the following examples: request, grant, valid, address, read data, write data, op code etc. These values are held until the request is granted, acknowledged or withdrawn. In some embodiments of the present invention, withdrawn requests may not be permitted.

In a pipelined system with strict ordering of requests, the requester identity is stored in a FIFO so that any return data or transaction can.be routed back to the correct requester. In a system where the returned transaction itself contains the information, the routing to the correct requester can be determined without the need for a FIFO.

Figure 4:
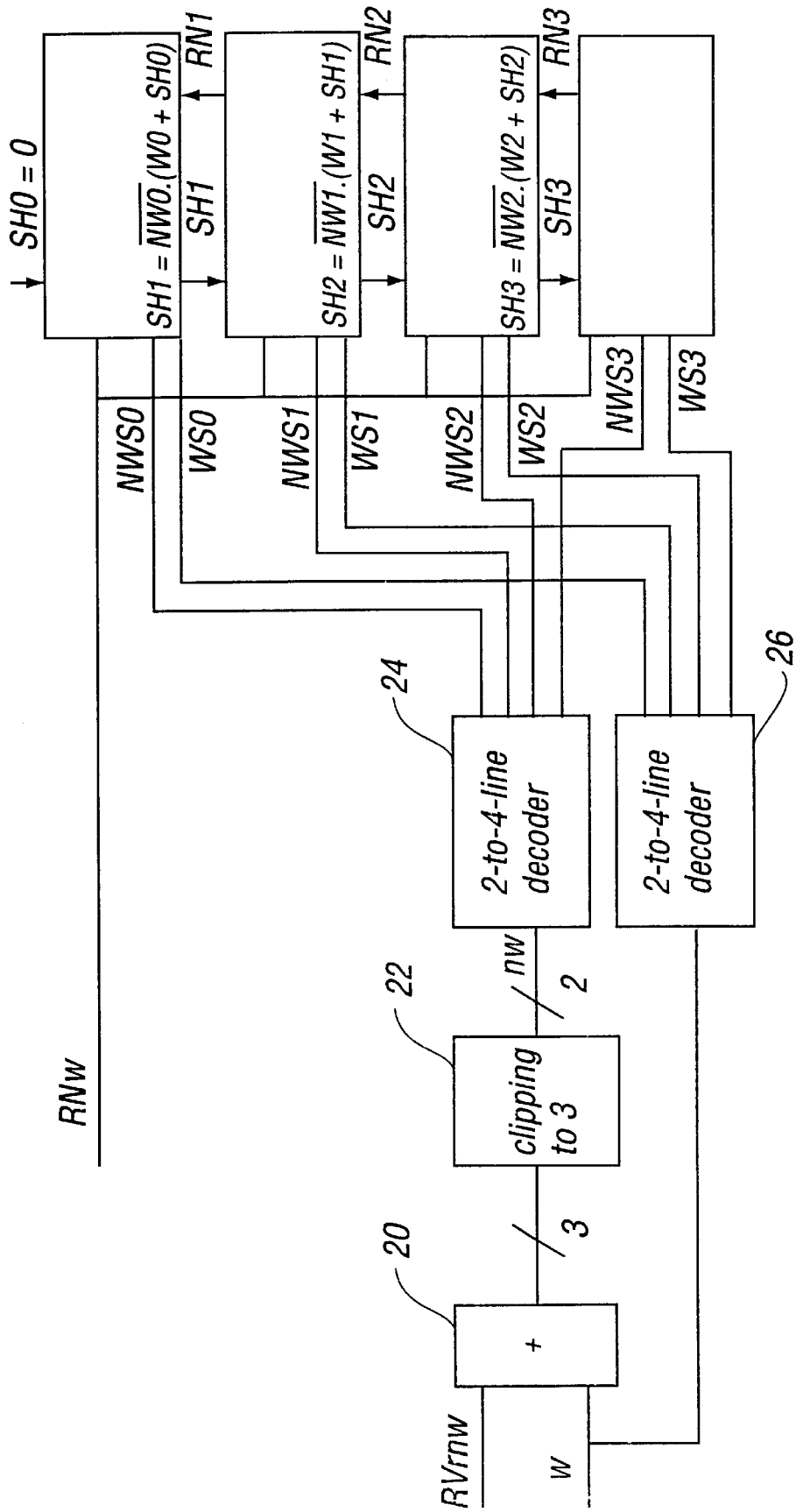
FIG. 4 shows an example of the implementation of the priority list of FIG. 3.

The winning requester identity is used to look up the relegation value, this being the output of the sixth multiplexer 16. This relegation value is used to determine the next state of the priority list, along with the position in the list that the winner has. All items further down the list than the winner will shift up one place. Reference is now made to FIG. 4 which shows an implementation for the priority list.

An adder 20 receives the relegation value for the winner $RV_{rnw}$ from the fifth multiplexer 16 and the priority W of the winner are added together producing an index nw with any overflow from a two bit result is changed to 3. In other words, the winner cannot be relegated to a position any lower than bottom. The three bit output from the adder 20 is input to a clipper 22 which if the output of the adder is in a three bit format is clipped to a two bit format with the value being 3 (i.e. 11). The output of the clipper 22 is input to a first 2 to 4 line decoder 24.

The value w is also input directly to a second 2 to 4 line decoder 26. The first and second decoders each have an input to each of the registers 6a to 6d making up the priority list. Each register's logic tells the one below if it should shift up. This is done if its w select line (WS) from the second 2 to 4 line decoder 26 is high or if it is being told to shift by the register above it via signal SHn and it is not the new location of the winner, that is its NW select line (NWSn) from the first 2 to 4 line decoder 24 is high.

The first register 6a has its SH line tied low as it cannot shift higher and the SH output of the last register 16 is not used. This approach can be extended to a list of any depth.

Consider the example where the register 6a currently has a value 01 register 6b has the value 11, register 6c has the value 10 and register 6d has the value 00. The device associated with register 6a has won the arbitration and has a relegation value of 2. The first register 6a receives the values contained in the second register 6b. The values contained in the third register 6c are moved into the second register 6b. The values from the first register are moved into the third register 6c and the fourth register is unchanged.

This method can be used with a list of any depth and can also be used, with suitable modifications, with the second embodiment.

Within each register at index n in the priority list, the new value will be that of RNw if NWSn is active otherwise the incoming shift value from below if SHn is active otherwise it stays the same. It is an error in the system if SH3 is high when RN3 is low so it can be eliminated to save space if required. Also, WS3 is not required as the SH4 signal is ignored.

Embodiments of the present invention can be implemented in a direct memory access controller. Embodiments of the present invention described hereinbefore have been described in the context of an arrangement where four devices are requesting access to for example a memory. This same technique can be used to arbitrate between different channels or between different requests or indeed any type of requesters. Embodiments of the present invention can be used to arbitrate between request for access to any resource, including a bus, a memory or the like.

The arbiter embodying the present invention can be used in any suitable application. One possible application will now be described.

In the following description reference is made to an exemplary embodiment in which an MPEG-2 transport stream is demultiplexed in a programmable transport interface of a receiver in a digital set-top-box.

Figure 5:
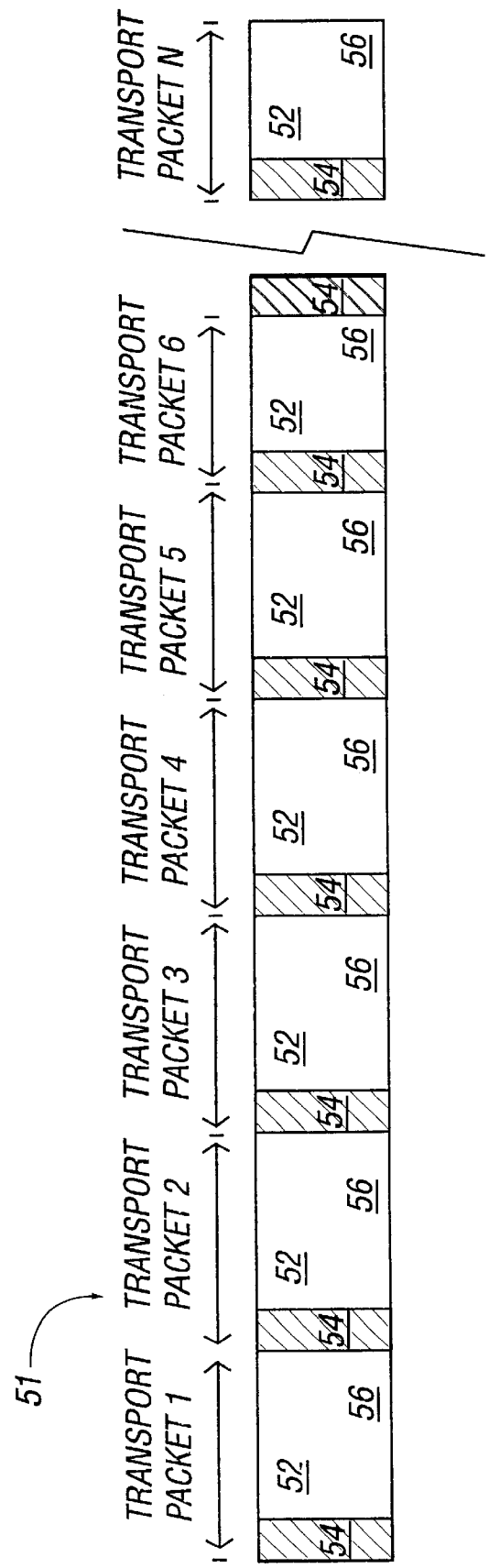
FIG. 5 illustrates a portion of a transport stream.

FIG. 5 illustrates a portion of a transport stream 51 which is composed of a series of N transport packets 52. Each transport packet 52 comprises a transport packet header 54 and a transport packet payload 56. The transport stream is a bit stream which carries in the transport packet payloads 56 information for recreating, for example, a number of different television programmes. The transport stream is formed by source encoding the television programmes. The transport stream is then typically channel encoded for transmission (by satellite or cable) and channel decoded on its reception to reproduce the transport stream. The transport stream is then source decoded to recreate a selected one of the different television programmes. Each particular television programme requires three types of information (audio information, video information and tables of programme information) for its recreation. Each transport packet 52 is preferably associated with a particular television programme, a particular source encoding time and a particular one of the information types. The individual transport packets are time division multiplexed to form the transport stream and allow the real-time recreation of any one of the different television programmes from the transport stream. To recreate a television programme the transport stream is sequentially demultiplexed to recover only the transport payloads 56 of audio information, video information and tables of programme information which are associated with the selected television programme. The recovered payloads are then decoded and used to recreate the television programme.

According to the MPEG-2 digital video broadcast (DVB) standard each of the transport packets 52 is 188 bytes long and the transport packet header 54 is 4 bytes long. The transport packet payload 56 contains either audio or video information or sections. The sections are parts of tables. The audio and video information and the sections in the payloads 56 are packetised and encoded in accordance with the MPEG-2 DVB compression standard.

Figure 6:
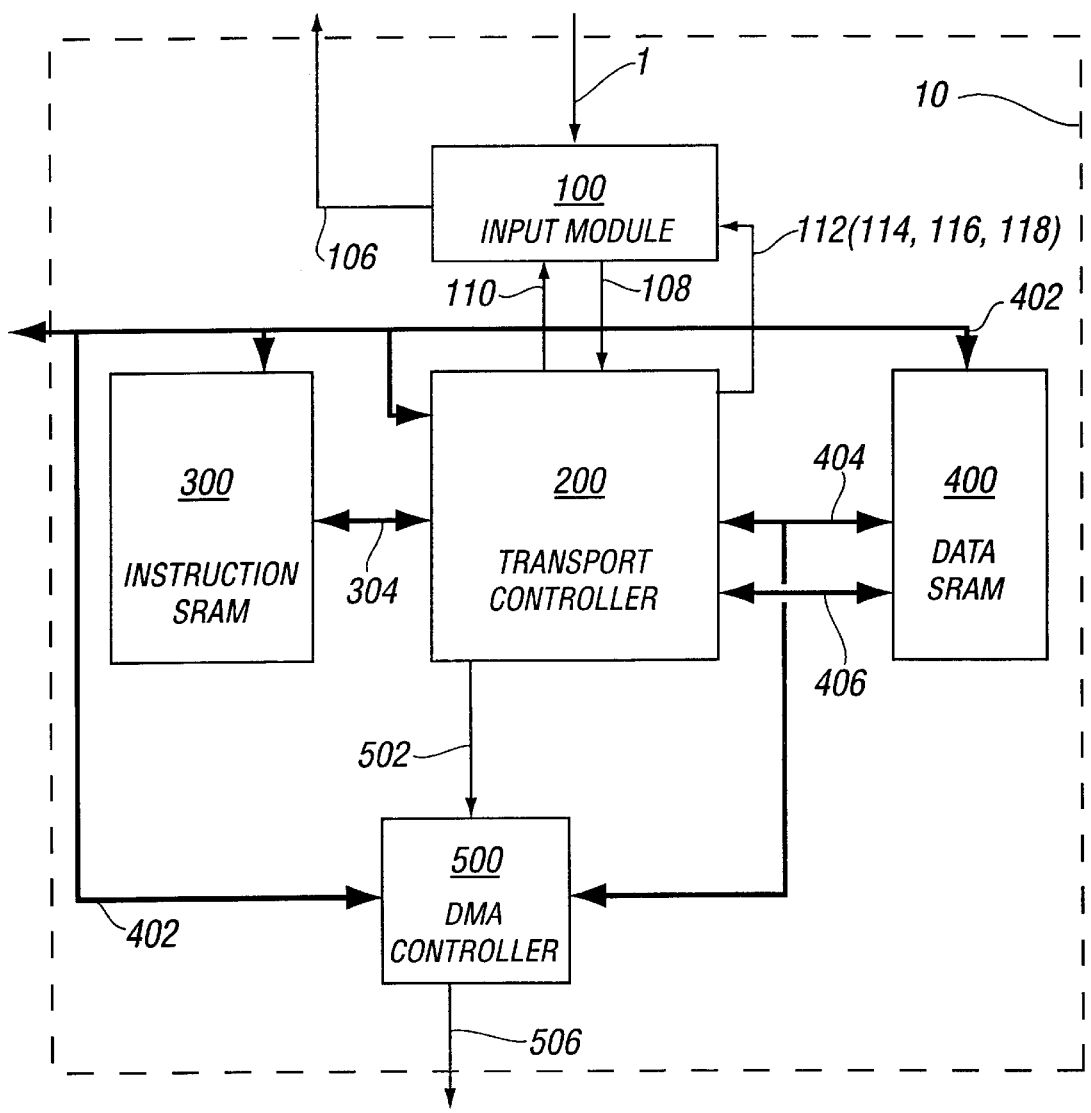
FIG. 6 illustrates in block schematic form a programmable transport interface.

A programmable transport interface 110, illustrated in FIG. 6, is used to process a transport stream 51 and produce a data output stream 506 suitable for reconstitution as a television programme after MPEG-2 decoding by MPEG-2 decoders (not shown). The programmable transport interface 110 is included in a receiver which receives the transport stream 51.

The transport packet header 54 contains a synchronisation byte which identifies the beginning of each transport packet 52. The transport packet header also contains a packet identification (PID) which identifies the information type and the television programme associated with the transport packet payload 56. The transport packet 52 also contains information identifying the source encoding time of the transport packet. The transport packet header 54, including the synchronisation byte and the PID, is not scrambled. The transport packet payload 56 may be scrambled.

The programmable transport interface (PTI) 110 performs various functions including:

i) using the synchronisation byte to identify the start of a transport packet 52;

ii) using the packet identification (PID) to identify, amongst other functions, the type of information contained in the packet (i.e. audio or video information or sections) and the television programme it represents;

iii) descrambling the transport packet payloads 56; and iv) demultiplexing the transport stream 51 to produce a data output stream 506.

The data output stream 506 comprises a stream of audio information associated with the selected television programme, a stream of video information associated with the selected television programme, or tables of programme information associated with the selected television programme. The PTI outputs these streams to the necessary MPEG-2 decoders to reproduce the selected television programme.

The programmable transport interface 110 comprises five primary functional blocks: an input module 100; a transport controller 200; an instruction SRAM (static RAM) 300; a data SRAM (static RAM) 400; and a multi-channel DMA (direct memory access) controller 500.

The input module 100 receives the transport stream 51, and outputs an alternative output stream 106. The input module 100 identifies the synchronisation byte of each transport packet which is used to synchronise the system clock and the transport stream. The input module 100 is controlled by the transport controller 200 via an input module control signal 112 which includes a descrambling control signal 114, an alternative stream control signal 116 and output stream control signals 118. The input module 100 provides bits to the transport controller 200 via an interconnect 108 and it receives bits back from the transport controller 200 via the interconnect 110. The input module, under the control of the transport controller 200 via the input module control signal 112, descrambles the payload 56 of selected transport packets 52 and supplies the selected descrambled payloads to the transport controller 200 via the interconnect 108. The descrambling of the payloads is controlled by the descrambling control signal 114 supplied by the transport controller 200 and the number and rate of bits supplied on the interconnect 108 is controlled by the output stream control signal 118. The input module 100 receives, along the interconnect 110, bits from the transport controller 200 which may be output as the alternative output stream 106 under the control of the alternative stream control signal 116.

The transport controller 200 operates on the bits received on interconnect 108 from the input module 100. The transport controller 200 receives from the input module 100 via interconnect 108 the transport packet header 54 of the transport packet 52 arriving at the transport stream input interface 102. The transport controller 200 uses the packet identifier (PID) in the transport packet header 54 to determine whether the transport packet 52 now entering the input module 100 is associated with a selected television programme for the programmable transport interface 110. If it is not, the received transport packet 52 is discarded. If it is, it controls the input module 100 to descramble (if necessary) the transport packet payload (as described above), and to supply the transport packet payload 56 via the interconnect 108 to the transport controller 200. The transport controller 200 may pass a payload 56 associated with audio of video information for the selected programme straight to the transport controller output 502. If the payload 56 relates to a section of a table the transport controller 200 may process the information before providing it at its output 502. Alternatively the transport controller 200 may process the received payloads 56 and repacketise them in accordance with a different transmission standard. The reformatted transport stream is then provided to the input module 100 via the interconnect 110 and it is output as the alternative output stream 106 under the control of the alternative stream control signal 116.

The transport controller 200 comprises a transport processor (not shown) which reads instruction sets from the instruction SRAM 300. The transport controller 200 is connected to the SRAM 300 by interconnect 304 and it reads its instructions via the interconnect 304. A system processor (not shown) may read and write to the instruction SRAM 300 via a system interface bus 402. However, the transport controller 200 has preferential access to the instruction SRAM 300 determined by an arbiter (not shown) which arbitrates between accesses by the transport controller 200 and the system processor. The system processor may also access the transport controller 200 via the system interface bus 402.

The data SRAM 400 can be accessed by the processor of the transport controller 200 via the interconnections 404 and 406. The processor of the transport controller uses the interconnection 404 to read from and write to the data SRAM 400. A search engine within the transport controller 200 reads from the data SRAM 400 along interconnection 406. The search engine searches the data SRAM 400 for the packet identifier (PID) in the incoming transport packet header 104. If the packet is not to be discarded, then the PID for that packet will have been stored in the data SRAM, and is located by the search engine of the transport controller. Associated with each PID in the data SRAM is a plurality of pointers, which point to other addresses in the data SRAM where other information associated with the incoming transport packet is stored. The search engine retrieves the pointers stored with a particular PID for use by the transport controller processor. The transport controller processor then uses the pointers to access all the information it needs to process the payload of the incoming transport packet. The pointers may, for example: point to descrambling keys for use by the input module 100; point to addresses for use by the DMA controller 500; identify whether the payload is video or audio information or sections, identify whether the payload is special data to be output on alternative output stream 106; or locate information for masking the search filter etc.

Thus, this information enables the transport controller to generate the input module control signals 112 as appropriate, and control the processing, if any, of the bits received on interconnect 108.

The transport controller 200 produces a transport controller output 502 which is supplied to the multi-channel DMA controller 500. The multi-channel DMA controller 500 supplies the data output stream 506, indirectly, to the MPEG-2 decoders (not shown in FIG. 6).

The system processor writes to each of the instruction SRAM 300, the transport controller 200 and the data SRAM 400 via the system interface bus 402. The instruction SRAM 300 can only be written to by the system processor: the transport controller can only read from, and not write to, its own instruction SRAM 300 via the interface 304. The system processor can also read from the instruction SRAM. An arbiter (such as described hereinbefore) is provided to arbitrate between accesses to the instructions SRAM 300 by both the system processor and the transport controller 200.

The system processor, via the system interface bus 402, and the transport controller 200 via interface bus 404, can both read and write to the data SRAM 400. The search engine of the transport controller 200 can only read from the data SRAM 400 via interface bus 406. The arbiter is provided to arbitrate accesses to the data SRAM 400 by each of the system processor, the transport controller 200, and the search engine within the transport controller 200. The transport controller may be reset by the system processor by a reset signal on the interface bus 302.

The system processor, via system interconnect bus 402, and the transport controller 200 via the bus 404, can both read and write to registers within the DMA controller 500. The arbiter is provided to arbitrate between the system processor and transport controller access to the DMA controller.

The system processor via system interface 402 also accesses registers within the transport controller 200, to read and write thereto.

The system processor initially writes to the instruction SRAM 300, the data SRAM 400, and registers within the transport controller 200 and the DMA controller 500, to configure them.

The DMA controller 500 of the programmable transport interface 10 of FIG. 6 controls the input into memory of demultiplexed data on lines 502 from the transport controller 200. The output 506 of the DMA controller 500 outputs, as will be described in further detail hereinafter, data demultiplexed by the transport controller 200 into appropriate areas of the main processor memory.

Figure 7:
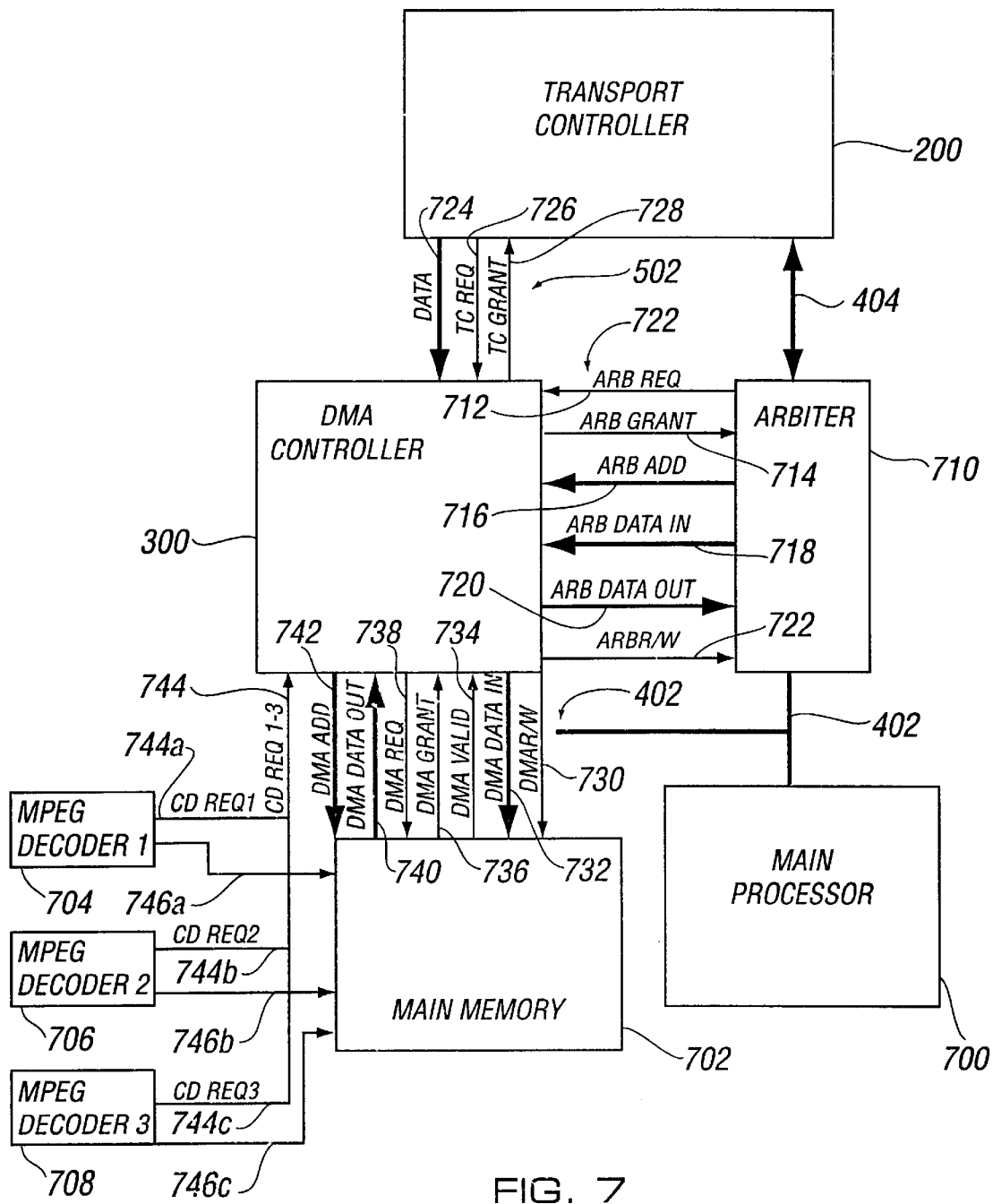
FIG. 7 illustrates in more detail the interconnection of the DMA controller of FIG. 6.

Referring now to FIG. 7, there is shown in more detail the interconnection of the DMA controller 500 with the transport controller 200, a main processor 700, a main memory 702, a first MPEG decoder 704, a second MPEG decoder 706, a third MPEG decoder 708 and an arbiter 710. The arbiter 710 is not shown in FIG. 6 for clarity purposes, but in fact arbitrates between accesses to the DMA controller 500 via the system interconnect bus 402 and the transport controller interconnect bus 404. Thus the arbiter 710 receive the transport controller interconnect bus 404 from the transport controller 200 and the main processor interconnect bus 402 from the main processor 700. The arbiter 710 then provides access to the DMA controller 500 for the one of the transport controller 200 and the main processor 700 which is chosen to have control of the DMA controller 500. The arbiter 710 generates an arbiter request signal ARBREQ on line 712 to the DMA controller 500, receives an arbiter grant signal ARBGRANT on line 714 from the DMA controller 500, generates an arbiter address ARBADD on lines 716 to the DMA controller 500, generates arbiter input data ARBDATAIN on line 718 to the DMA controller, receives arbiter output data ARBDATAOUT on line 720 from the DMA controller, and generates an arbiter read/write signal ARBR/W on line 720 to the DMA controller 500.

The transport controller 200 outputs the data to be transferred to processor memory 702 to the DMA controller 500 via output lines 502. As shown in FIG. 7 the output lines 502 include a set of data lines DATA 724, a transport controller request signal TCREQ on line 726 output by the transport controller 200 to the DMA controller 500 and a transport controller grant signal TCGRANT on line 728 output from the DMA controller 500 to the transport controller 200.

The memory which the DMA controller 500 outputs data to for storage is the main system memory 702, and therefore the output of the DMA controller 500 shown in FIG. 6 is, in this preferred implementation of the invention, the system interconnect bus 402. Thus in FIG. 7 the DMA controller 500 is shown outputting data onto the main system interconnect bus 402 rather than to the output signals 506.

The main system interconnect bus 402 between the DMA controller 500 and main memory 702 includes a DMA read/write signal DMAR/W on line 730 from the DMA controller 500 to the main memory 702, DMA data output signals DMADATAOUT on lines 732 from the DMA controller 500 to the main memory 702, a DMA request signal DMAREQ on line 738 from the DMA controller 500 to the main memory 702, a DMA grant signal DMAGRANT on line 736 from the main memory 702 to the DMA controller 500, a DMA valid signal DMAVALID on line 734 from the main memory 702 to the DMA controller 500, DMA input data DMADATAIN on lines 740 from the main memory 702 to the DMA controller 500, and a DMA address signal DMAADD on lines 742 from the DMA controller 500 to the main memory 702.

In alternative embodiments of the present invention, the arbiter embodying the present invention can be used to arbitrate between requests from different direct memory access channels.

In some embodiments of the present invention, a set of rules may be adopted to prevent a device from being starved of access. For example, at least two of the requesters may have a relegation value equal to the length of the list. No more than one of the devices should have a relegation value of 1. Finally, no device should have a relegation value of 0.

What is claimed is:

1. An arbiter for arbitrating between a plurality of requests from a plurality of requesters, said arbiter being arranged to assign an order of priority of said requesters, said arbiter being arranged to assign a relegation value to each of said requesters;
   wherein the requester having the highest priority and which has made a request winning the arbitration;
   wherein the relegation value and priority of the winner are added in an adder producing an index determining the priority of a winner of said arbitration after the winner has won an arbitration, said winner being given a priority different from the lowest priority.

2. An arbiter as claimed in claim 1, wherein the relegation value can be changed during use of said arbiter.

3. An arbiter as claimed in claim 1, wherein said arbiter has a list of requesters, the list defining the priority of said requesters, wherein said list is arranged to include at least one requester in at least two different positions in said list.

4. An arbiter as claimed in claim 3, wherein said list is longer than the number of requesters.

5. An arbiter as claimed in claim 1, wherein the arbiter is arranged to clip an output of said adder.

6. An arbiter for arbitrating between a plurality requests from a plurality of requesters, said arbiter being arranged to assign an order of priority to said requesters and relegation values to each of said requesters,
   wherein the relegation value and priority of the winner are added in an adder producing an index which determines the priority of a winner of said arbitration after the winner has won an arbitration.

7. An arbiter as claimed in claim 6, wherein the arbiter is arranged to clip an output of said adder.

8. An arbiter for arbitrating between a plurality of requests from a plurality of requesters, said arbiter having a list of requesters, at least some of said requesters making requests, the list defining the priority of said requesters, wherein said list is arranged to include at least one requester in at least two different positions in said list;
   wherein the winner of the arbitration performed by said arbiter is at the end of the list for the next arbitration.

9. An arbiter for arbitrating between a plurality of requests from a plurality of requesters, said arbiter assigning a priority and relegation value to each of said requesters, the priority assigned to each requester determining the frequency with which each requester wins an arbitration;
   wherein said arbiter is configurable to provide to the required priority for each requester and wherein the relegation value and priority of the winner are added in an adder producing an index determining the priority of a winner of said arbitration after the winner has won an arbitration.

10. An arbiter as claimed in claim 9, wherein said arbiter is configured prior to use.

11. An arbiter as claimed in claim 9, wherein said the configuration of said arbiter is alterable during use.

12. An arbiter as claimed in claim 1 for arbitrating between requests from requesters requesting access to a memory.

13. An arbiter as claimed in claim 1, wherein said requester comprises a device.

14. An arbiter as claimed in claim 1, wherein said requester comprises a channel.

15. An arbiter as claimed in claim 1, wherein said arbiter is arranged to consider only some of the requesters when arbitrating between said requesters, said considered requesters having the highest priority.

16. An arbiter as claimed in claim 9, wherein the arbiter is arranged to clip an output of said adder.

17. An integrated circuit comprising an arbiter for arbitrating between a plurality of requests from a plurality of requesters, said arbiter being arranged to assign an order of priority of said requesters, said arbiter being arranged to assign a relegation value to each of said requesters;
   wherein the requester having the highest priority and which has made a request wins the arbitration, and wherein the relegation value and priority of the winner are added in an adder producing an index determining the priority of a winner of said arbitration after the winner has won an arbitration, said winner being given a priority different from the lowest priority.

18. An integrated circuit comprising an arbiter for arbitrating between a requests from a plurality of requesters, said arbiter being arranged to assign an order of priority to said requesters and relegation information to each of said requesters, and wherein the relegation value and priority of the winner are added in an adder producing an index determining the priority of a winner of said arbitration after the winner has won an arbitration.

19. An integrated circuit comprising an arbiter for arbitrating between a plurality of requests from a plurality of requesters, said arbiter having a list of requesters, at least some of said requesters making requests, the list defining the priority of said requesters, wherein said list is arranged to include at least one requester in at least two different positions in said list, and wherein the winner of the arbitration performed by said arbiter is at the end of the list for the next arbitration.

20. An integrated circuit comprising an arbiter for arbitrating between a plurality of requests from a plurality of requesters, said arbiter assigning a priority and relegation value to each of said requesters, the priority assigned to each requester determining the frequency with which each requester wins an arbitration, wherein said arbiter is configurable to provide to the required priority for each requester, and wherein the relegation value and priority of the winner are added producing an index determining the priority of a winner of said arbitration after the winner has won an arbitration.

21. A method of arbitrating between a plurality of requests from a plurality of requesters, said method comprising:
   assigning an order of priority to the requesters;
   assigning a relegation value to each of said requesters;
   determining which requester has the highest priority and which has made a request, said requester winning the arbitration; and
   determining a new priority for the winning requester, the new priority being determined by an index produced by adding the relegation value and the priority of the winner and being different from the lowest priority.

22. The method of arbitrating as claimed in claim 21, further comprising the step of clipping the output of the adding of the relegation value and the priority of the winner.

* * * * *